United States Patent
Milks, III

(10) Patent No.: US 9,935,493 B2
(45) Date of Patent: Apr. 3, 2018

(54) CIRCUIT FOR REDUCING ELECTRICAL POWER CONSUMPTION

(71) Applicant: William C. Milks, III, Palo Alto, CA (US)

(72) Inventor: William C. Milks, III, Palo Alto, CA (US)

( * ) Notice: Subject to any disclaimer, the term of this patent is extended or adjusted under 35 U.S.C. 154(b) by 639 days.

(21) Appl. No.: 13/844,654

(22) Filed: Mar. 15, 2013

(65) Prior Publication Data

US 2014/0265602 A1     Sep. 18, 2014

(51) Int. Cl.
    *H02J 9/00*     (2006.01)

(52) U.S. Cl.
    CPC ......... *H02J 9/005* (2013.01); *H02J 2009/007* (2013.01); *Y10T 307/696* (2015.04)

(58) Field of Classification Search
    CPC ......... Y10T 307/696; H02J 9/06; H02J 9/005; H02J 2009/007
    USPC ............................................. 307/80, 43, 125
    See application file for complete search history.

(56) References Cited

U.S. PATENT DOCUMENTS

| | | | | |
|---|---|---|---|---|
| 5,873,559 A | * | 2/1999 | von Flotow | F16F 15/02 248/550 |
| 2008/0150609 A1 | * | 6/2008 | Durbaum | 327/513 |
| 2008/0197705 A1 | * | 8/2008 | Dewis | H02J 9/08 307/65 |
| 2009/0224603 A1 | * | 9/2009 | Perper et al. | 307/43 |
| 2010/0201208 A1 | * | 8/2010 | Berghegger et al. | 307/125 |
| 2012/0201062 A1 | * | 8/2012 | Lee | H02J 9/005 363/84 |
| 2012/0326502 A1 | * | 12/2012 | Nguyen | H02J 9/005 307/21 |

\* cited by examiner

*Primary Examiner* — Thai Tran

(57) ABSTRACT

A control circuit includes a first input coupled to a power source, a second input coupled to an output of a power supply, and an output coupled to an input of the power supply. The control circuit senses current at the power supply output. If the sensed current exceeds a threshold, the control circuit connects the power supply input to the power source. If sensed current does not exceed the threshold, the control circuit disconnects the power supply input from the power source and applies a voltage to the power supply output. If the sensed current exceeds the threshold while the power supply input is disconnected from the power source and while the control circuit is applying voltage to the power supply output, the control circuit discontinues application of voltage to the power supply output and connects the power supply input to the power source.

7 Claims, 5 Drawing Sheets

CIRCUIT FOR REDUCING ELECTRICAL POWER CONSUMPTION

BACKGROUND

Globally, the consumption of energy has escalated. More particularly, the consumption of electrical energy has grown dramatically.

Energy conservation measures, such as the Energy Star program to improve the efficiency of electrical appliances, have been implemented to conserve electrical energy. However, initiatives to alter the habits of consumers of electrical energy at the grassroots level have not had a significant impact in reducing the amount of electrical energy that is wasted.

By way of a non-limiting example, the use of battery-powered electronic devices, such as laptop, notebook, and tablet computers, personal digital assistants (PDAs), smartphones, cell phones, etc., has proliferated in recent years throughout the world. Typically, such electronic devices have rechargeable batteries, such as rechargeable lithium ion batteries, housed in the devices to provide power to operate the devices. In order to recharge the batteries, many electronic devices have a battery charger built into the devices, which connects to a power supply, for example, via a mini USB connector. The power supply is plugged into a standard 110 VAC electrical power outlet or other standard power outlet which feeds electrical power to the power supply which supplies power to the battery charger to charge the batteries.

However, users of laptop, notebook, and tablet computers, smartphones, cell phones, etc., may leave the devices connected to power supplies after the batteries have been charged, or disconnect the devices from power supplies, without unplugging the power supplies from the 110 VAC electrical power outlet. Hence, the power supplies, which typically comprise a transformer and other circuitry, continue to consume electrical power, albeit at a relatively low rate compared to the power consumed while the batteries are being charged. Nevertheless, because of the immense number of electronic devices that are in use worldwide and forecast increase in that number in the future, the cumulative power that is wasted by leaving the power supplies plugged into 110 VAC electrical power outlets is substantial and growing, as more and more electronic devices are placed in service.

These and other limitations of the prior art will become apparent to persons of skill in the art upon a reading of the following descriptions and a study of the several figures of the drawing.

SUMMARY

Example embodiments are provided to reduce energy consumption by discontinuing the power fed to the input of a power supply when the power is no longer required by a load connected to the output of the power supply. For example, the load may be a battery charger to charge one or more batteries in an electronic device, such as a laptop, notebook, or tablet computer, personal digital assistant (PDA), smartphone, cell phone, etc. Thus, when the electronic device is disconnected from the power supply, or the one or more batteries have been charged, the power fed to the power supply is discontinued. If a load is connected to the power supply or an already connected load requires power following discontinuation of power to the input of the power supply, such as when the electronic device is reconnected to the power supply or the batteries need to be charged, power is again fed to the input of the power supply.

Example embodiments provide a control circuit to reduce electrical energy consumption by a power supply, comprising first circuitry to connect an input of the power supply to a power source when power is required by a load connected to an output of the power supply and to disconnect the input of the power supply from the power source when power is not required by the load connected to the output of the power supply; second circuitry to apply a voltage to the output of the power supply when the input of the power supply is not connected to the power source and to not apply the voltage to the output of the power supply when the input of the power supply is connected to the power source; third circuitry to sense current at the output of the power supply; fourth circuitry to determine when the sensed current at the output of the power supply exceeds a threshold; and fifth circuitry to cause the first circuitry to connect the input of the power supply to the power source when the threshold is exceeded and to cause the first circuitry to disconnect the input of the power supply from the power source when the threshold is not exceeded.

Other example embodiments provide a control circuit having a first input adapted to be coupled to a power source, a second input adapted to be coupled to an output of a power supply to sense current at the output of the power supply, and an output coupled to an input of the power supply. The control circuit senses the current at the output of the power supply and selectively controls the connection of the input of the power supply to the power source. If the current at the output of the power supply is sensed to exceed a predetermined threshold, the control circuit connects the input of the power supply to the power source. If the current at the output of the power supply is sensed not to exceed the predetermined threshold, the control circuit disconnects the input of the power supply from the power source and applies a voltage to the output of the power supply. If the current at the output of the power supply is sensed to exceed the predetermined threshold while the input of the power supply is disconnected from the power source and while the control circuit is applying voltage to the output of the power supply, the control circuit discontinues application of voltage to the output of the power supply and connects the input of the power supply to the power source.

In one example embodiment the control circuit is a separate circuit coupled to the power supply. In another example embodiment, the circuitry of the control circuit is integrated into the circuitry of the power supply.

In one example implementation of the control circuit, the control circuit comprises a Hall Effect device to sense the current. In other example implementations, the control circuit may comprise one of various current sensors.

These and other embodiments, features, and advantages will become apparent to persons of skill in the art upon a reading of the following descriptions and a study of the several figures of the drawing.

BRIEF DESCRIPTION OF THE DRAWING

Several example embodiments will now be described with reference to the drawing, wherein like components are provided with like reference numerals. The example embodiments are intended to illustrate, but not to limit, the invention. The drawing includes the following figures.

DETAILED DESCRIPTION OF EXAMPLE EMBODIMENTS

Figure 1:
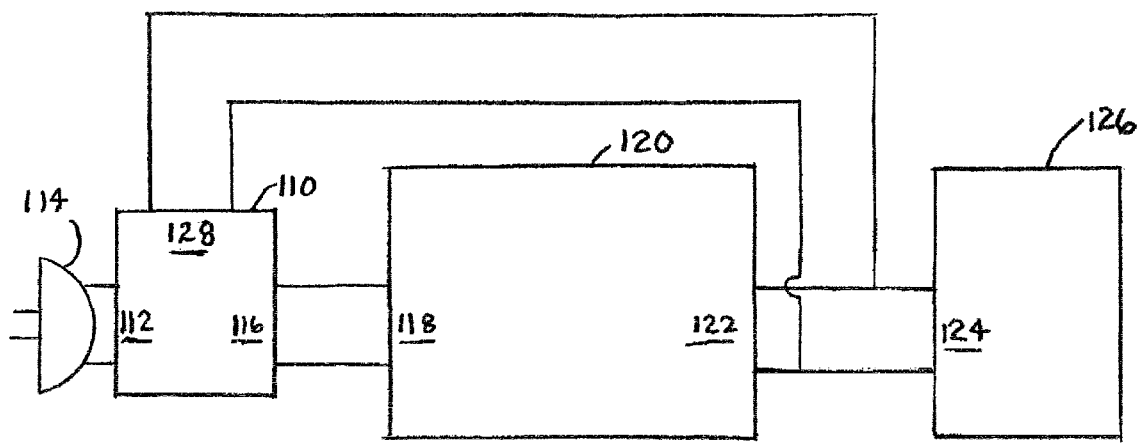
FIG. 1 is a schematic block diagram of an example embodiment in accordance with the present invention.

FIG. 1 is a schematic block diagram which shows a non-limiting example embodiment of an electrical power reduction control circuit 110 having an input 112 coupled to an electrical power outlet 114 which may be a standard 110 VAC power outlet or other source of electrical power. An output 116 of the control circuit 110 is coupled to an input 118 of a power supply 120 to feed power from the power outlet 114 to the power supply. The power supply 120 has an output 122. In this non-limiting example, the output 122 of the power supply 120 is coupled to an input 124 of an electronic device 126 to feed power to the electronic device. For example, the electronic device may be a battery-powered electronic device, such as a laptop, notebook, or tablet computer, personal digital assistant (PDA), smartphone, cell phone, etc. In this non-limiting example, the output 122 of the power supply 120 may supply a five VDC standard USB voltage bus output. The input 124 of the electronic device 126 may be coupled to a battery charger housed in the electronic device. The control circuit 110 also has an input 128 coupled to the output 122 of the power supply 120.

In operation, the control circuit 110 senses the current at the output 122 of the power supply 120 coupled to the input 124 of the electronic device 126. So long as the amperage of the current exceeds a predetermined threshold, the control circuit 110 connects the input 118 of the power supply 120 to the electrical power outlet 114 so that the power supply in turn feeds power to the input 124 of the electronic device 126. In the non-limiting example in which the input 124 of the electronic device 126 is coupled to a battery charger, the current will exceed the predetermined threshold so long as the electronic device is coupled to the power supply and the battery charger is charging the battery(ies) of the electronic device. Conversely, if the electronic device is disconnected, or the battery(ies) of the electronic device 126 have been charged to an extent that the current at the output of the power supply 120 decreases below the predetermined threshold, the control circuit 110 disconnects the input 118 of the power supply from the power outlet 114.

The control circuit 110 continuously senses the current at the output 122 of the power supply 120. When the control circuit 110 disconnects the input 118 of the power supply 120 from the power outlet 114, the power supply 120 does not apply a voltage at the output 122. Instead, the control circuit 110 causes a voltage to be applied at the output 122 of the power supply 120. By way of non-limiting example, the voltage applied by the control circuit may be the same voltage as is applied by the power supply 120 at the output 122, or may be a higher or lower voltage that is preferably approximately the same voltage as is applied by the power supply when the power supply is connected to the power outlet 114. If the electronic device 126 has been disconnected but is reconnected, or the battery(ies) have discharged to the extent that the current at the output 122 of the power supply 120 sensed by the control circuit 110 exceeds the predetermined threshold, the control circuit discontinues applying the voltage at the output 122 and connects the input 118 of the power supply to the power outlet 114 to feed power to the input 124 of the electronic device 126.

As a result of the operation of the control circuit 110, the power supply 120 does not consume power when the battery(ies) of the electronic device 126 are charged but the user does not disconnect the device from the power supply, or unplug the power supply from the power outlet 114. Also, if the user disconnects the electronic device 126 from the power supply 120, but fails to unplug the power supply, the power supply does not consume power. Consequently, the control circuit 110 reduces power that would otherwise be wasted if the power supply 120 remains coupled to the power outlet when the power supply is not supplying power to charge the battery(ies) of the electronic device 126.

Three off-the-shelf power supplies were tested by plugging them into an isolated 110 VAC power source to determine the quiescent current drawn without an electronic device connected to the outputs of the power supplies. The currents drawn by the off-the-shelf power supplies were measured using a Fluke 77 current meter using the 300 mA input to be in the range of 1.0 to 1.25 mA. In contrast, the quiescent current drawn by an example implementation of the control circuit 110 connected to the same isolated 110 VAC power source was measured to be approximately 0.5 mA. As a result, the tests demonstrated a 50% to 60% reduction in power consumption using the control circuit 110.

Figure 2:
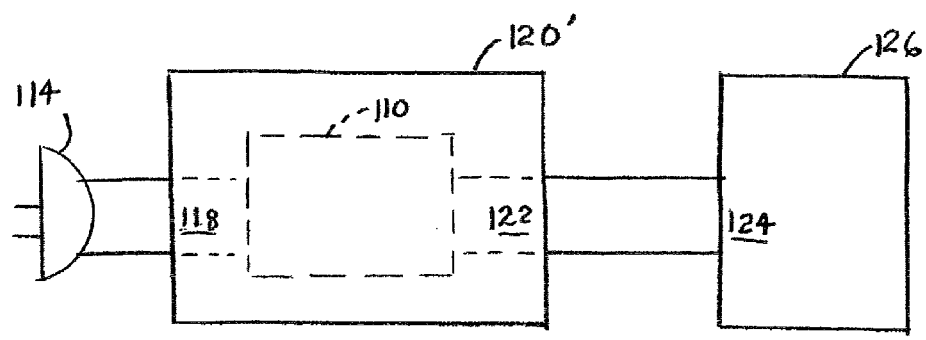
FIG. 2 is a schematic block diagram of another example embodiment in accordance with the present invention.

FIG. 2 is a schematic block diagram of an example embodiment in which a power supply 120' is modified by integrating the control circuit 110 into the power supply. As a result, the power consumed by the power supply 120' is reduced when plugged into the power outlet 114 when not being operated to feed power to the electronic device 126.

Figure 3:
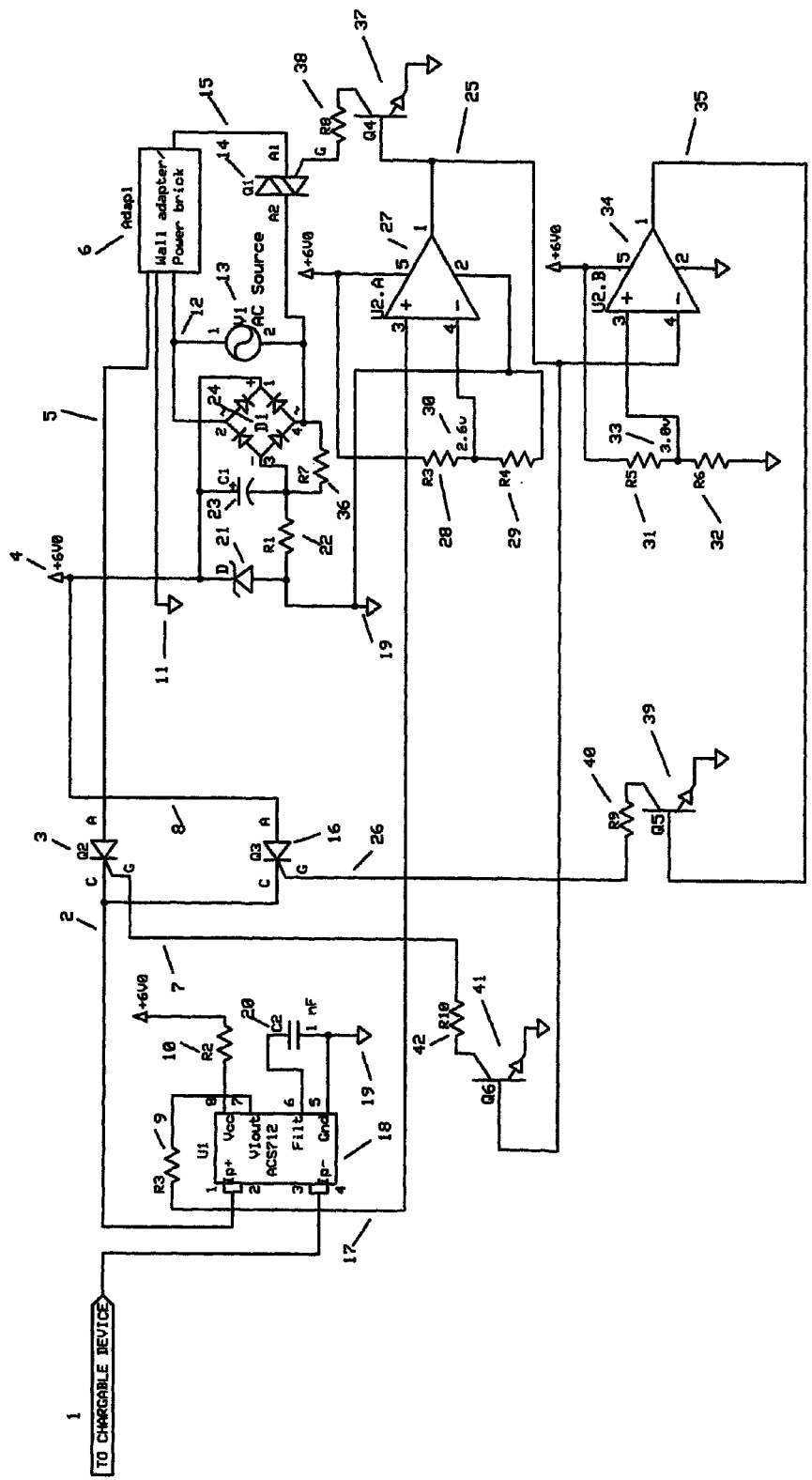
FIG. 3 is a schematic circuit diagram of an example implementation of features of various example embodiments in accordance with the present invention.
Figure 4:
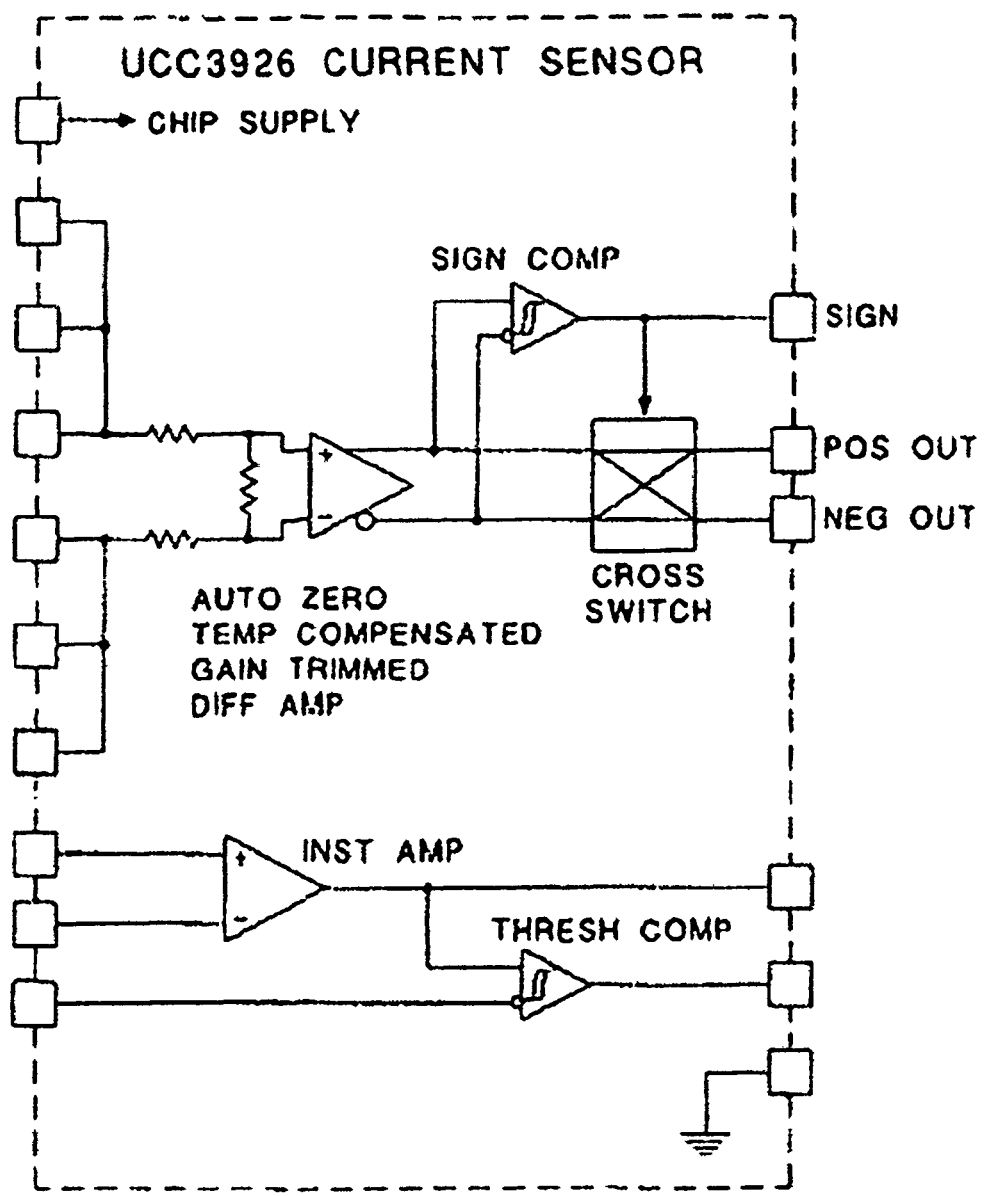
FIG. 4 is a schematic circuit diagram of an example of a resistance sensing device.
Figure 5:
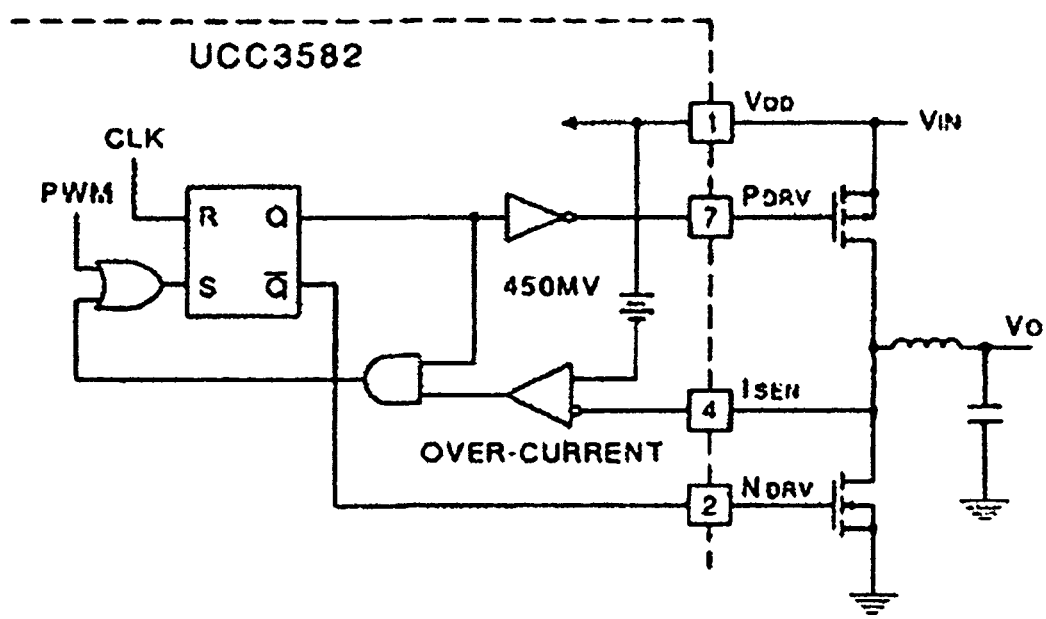
FIG. 5 is a schematic circuit diagram of an example of a sense-FET device.
Figure 6:
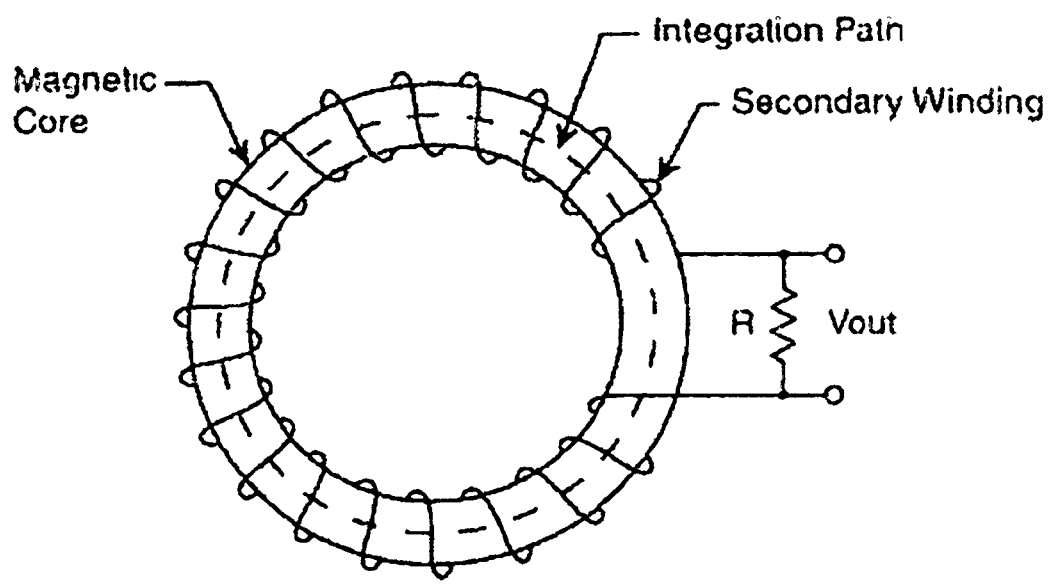
FIG. 6 is a schematic circuit diagram of an example of a magnetic sensing device.

FIG. 3 shows a non-limiting example implementation of a control circuit in accordance with the example embodiments previously described.

By way of a non-limiting example, a chargeable device, such as a cell phone, laptop computer, etc., receives charging current from a power supply in the form of a wall adapter, sometimes called a "power brick" if it tends to be a larger size, over a charging cable. The charging current is at a low voltage, typically six VDC for a cell phone, a voltage that is still high enough to provide overhead for the still lower voltages utilized by the chargeable device.

As shown in FIG. 3, a chargeable device 1 receives its charging power from a wall adapter 6 over a charging cable 5, but charging current must also pass through the intervening silicon-controlled rectifier (SCR) 3, as well as through a junction cable 2, and finally through a Hall Effect current sensor 18. The gate of the SCR 3 is controlled by a signal 7 from the control circuit logic through a switch transistor 41 to either permit or inhibit the flow of charging current to the junction cable 2, depending on the state of the control circuit.

A complementary SCR 16 is also connected to the junction cable 2. The gate of the complementary SCR 16 is controlled by a signal 26 complementary to the signal 7. The complementary SCR 16 opens or closes an electrical path to the junction cable 2 from a six VDC supply 4.

The junction cable 2 connects to the input of the Hall Effect current sensor 18 through a port labeled "Ip+". The chargeable device connects to the Hall Effect current sensor 18 through the sensor's output port labeled "Ip−". The current to the chargeable device is thus measured by the Hall Effect current sensor 18. The Hall Effect current sensor 18 functions as a load detector that determines whether or not a chargeable device is connected to the power brick 6. A connected chargeable device constitutes the Loaded state, and the absence of a chargeable device constitutes the NoLoad state.

When the control circuit is in the NoLoad state, zero current flows through the Hall Effect current sensor 18. In the case of the Allegro Micro Systems ACS712 Hall Effect current sensor shown 18, the output voltage from port Vlout is 2.5 VDC or half of the five VDC supply, Vcc. The five VDC Vcc supply is derived from the six VDC supply 4 through a series resistor 10 whose value is chosen to yield the five VDC Vcc for the Hall Effect current sensor 18. Other methods are well-known in the art to derive a DC voltage from a higher-value DC voltage; the simple series resistor shown is an effective low-cost method when there is low current passing through the series resistor, provided the resistor can handle the power dissipation.

When the control circuit is in the NoLoad state, the 2.5 VDC output, VIout, from the Hall Effect current sensor 18 passes through a current-limiting series resistor 9 to drive the positive input of a comparator 27. The negative input of comparator 27 is fixed at 2.6 VDC 30 by means of voltage divider resistors 28 and 29. In this state, the comparator 27 outputs to wire 25 a "low" or DC ground voltage. The wire 25 keeps the gate of a Triac 14 grounded and the Triac 14 non-conducting. The non-conducting state of the Triac 14 keeps the wall adapter 6 unpowered. The wire 25 is also connected to the gate of an SCR 3, which isolates the output of the wall adapter 6 from the junction cable 2.

When the comparator 27 is in the above-described NoLoad state, the output of the comparator is applied to the negative input of a comparator 34. Three VDC 33 is applied to the positive input of the comparator 34. The three VDC 33 is derived from voltage divider resistors 31 and 32 off the six VDC supply. The comparator 34 thus inverts the output of the comparator 27, producing an output 35 of 0 volts when the output 25 of the comparator 27 is six VDC, and vice versa. The output 35 of the comparator 34 is wired to the gate of the SCR 16. The two SCRs 3 and 16 are thus driven in a logically complementary fashion, such that either the wall adapter 6 or the 6 VDC supply 4 is supplying voltage to the junction cable 2.

The Hall Effect current sensor 18 outputs approximately 2.7 VDC when the sensor detects a current of approximately 750 mA, a current value that a typical non-fully charged cell phone would draw when connected to the junction cable 2. This would be the Loaded state. This 2.7 VDC from the Hall Effect current sensor 18 applied to the positive input of the comparator 27 sets the output 25 of comparator 27 to six VDC. The six VDC output is applied to the gate of the Triac 14 and causes the Triac to conduct current from a standard 110 VAC power source 13 that powers the wall adapter 6. The output 25 from the same comparator 27 at six VDC is simultaneously controlling the gate 7 of the SCR 3, which makes the SCR 3 conduct charging current from the wall adapter 6 to the junction cable 2. In this state, the logically complementary output 35 of the comparator 34 is at ground, which causes the SCR 16 to be non-conducting.

During the state change from the Loaded state to the NoLoad state, or vice versa, there can be a transient period when both s 3 and 16 are transitioning, and thus both the wall adapter 6 and the six VDC supply 4 may be simultaneously connected to the junction cable 2 in an electrical contention. Either the wall adapter 6 or the six VDC supply 4 will "win" as the driver, and the other voltage will be driven, depending on output impedances of the sources.

However, given the near equality of the voltages, no ill effects to the control circuit should occur from such a transient connection, provided the connection's transition time is no longer than a few milliseconds. With modern integrated circuits, the transition time should be easily less than tens of microseconds for inexpensive, low-power devices. If a designer wanted to ensure that no such electrical contention occurred, the designer could make modifications, well-known in the art. Well-known techniques, such as cascading additional comparators for delay, or adding hysteresis through positive feedback to a comparator, together with a shift of the reference voltage level with unequal voltage divider resistors 31 and 32 that would provide asymmetry to the comparator's transition levels (http://www.analog.com/library/analogDialogue/archives/34-07/comparators/), are some well-known techniques that can be applied to a modified topology of the disclosed embodiment, which would work around electrical contention.

The six VDC supply 4 is furnished by a conventional bridge rectifier topology 24, as is well-known in the art. A zener diode 21 sets the six VDC supply level, as is also well-known in the art. A capacitor 23 filters the rectified voltage and stores a charge for use by the low-voltage side of the control circuit, as is well-known in the art. A resistor 36 of sufficiently high wattage dissipation capability and properly chosen low resistance connects the high voltage AC primary with the low voltage DC secondary. This properly-chosen resistor provides a sufficient ground path from the MT2 terminal of the Triac 14 through its gate, and through pass switch transistor 37 to ground to turn the Triac on, while at the same time this resistor provides sufficient isolation between the AC primary and DC secondary so the six VDC supply 4 remains clean.

Details respecting the Hall Effect current sensor may be found at http://embedded-lab.com/blog/?p=4469 and http://embedded-lab.com/blog/?p=4529, the disclosures of which are hereby incorporated in their entirety by this reference. In other example embodiments, a different current sensor may be substituted for the Hall Effect current sensor 18. Various current sensors are described in B. Mammano, "Current Sensing Solutions for Power Supply Designers," Texas Instruments Incorporated, 2001, the disclosure of which is hereby incorporated by this reference in its entirety.

Accordingly, the control circuit 110 includes a first input coupled to a power source, a second input coupled to an output of a power supply, and an output coupled to an input of the power supply. The control circuit 110 senses current at the power supply output. If the sensed current exceeds a threshold, the control circuit 110 connects the power supply input to the power source. If sensed current does not exceed the threshold, the control circuit 110 disconnects the power supply input from the power source and applies a voltage to the power supply output. If the sensed current exceeds the threshold while the power supply input is disconnected from the power source and while the control circuit 110 is applying voltage to the power supply output, the control circuit 110 discontinues application of voltage to the power supply output and connects the power supply input to the power source.

Although various example embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawing figures. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A control circuit to reduce electrical energy consumption by a power supply comprising:

first circuitry having an input connected to a power source and having an output selectively coupled to an input of the power supply to connect the input of the power supply to the power source;

a load detector having an input selectively coupled to the output of the power supply, the load detector having a first output connected to a node adapted to be connected to a load to sense load current;

second circuitry having an input connected to the input of the first circuitry and an output selectively coupled to the input of the load detector to cause a voltage to be applied to the input of the load detector when the input of the power supply is not connected by the first circuitry to the power source and to cause the voltage not to be applied to the input of the load detector when the input of the power supply is selectively coupled by the first circuitry to the power source;

third circuitry connected to a second output of the load detector to compare the sensed load current to a threshold; and fourth circuitry connected to the first circuitry and the third circuitry to one of a) cause the first circuitry to connect the input of the power supply to the power source if the sensed load current exceeds the threshold and b) to cause the first circuitry to disconnect the input of the power supply from the power source and the second circuitry to apply the voltage to the input of the load detector when the sensed load current does not exceed the threshold;

wherein the second circuitry comprises a bridge rectifier connected to the power source to produce the voltage and a silicon-controlled rectifier connected to the bridge rectifier to selectively cause the voltage to be applied to the input of the load detector.

2. The control circuit as recited in claim 1 wherein the load is a battery charger to charge one or more batteries in an electronic device.

3. The control circuit as recited in claim 1 wherein the control circuit is integrated into the power supply.

4. The control circuit as recited in claim 1 wherein the first circuitry comprises a triac having an input connected to the power source and an output selectively connected to the input of the power supply.

5. The control circuit as recited in claim 1 wherein the load detector comprises a current sensor selected from among the group of current sensors consisting of a Hall Effect current sensor, a resistance sensing device, a magnetic sensing device, and a sense-FET device.

6. The control circuit as recited in claim 1 wherein the third circuitry comprises a pair of cascaded comparators connected to a second output of the load detector.

7. The control circuit as recited in claim 1 further comprising a silicon-controlled rectifier having an input coupled to the output of the power supply and an output selectively connected to the input of the load detector.

* * * * *